United States Patent
Devireddy (12) 
(10) Patent No.: US 10,904,088 B2
(45) Date of Patent: Jan. 26, 2021

(54) RECONFIGURING NETWORK SETTINGS FOR OPERATING CONFIGURATION INSTALLATION

(71) Applicant: Western Digital Technologies, Inc., San Jose, CA (US)

(72) Inventor: Kishore Kumar Reddy Devireddy, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 107 days.

(21) Appl. No.: 16/192,465

(22) Filed: Nov. 15, 2018

(65) Prior Publication Data
US 2020/0162317 A1 May 21, 2020

(51) Int. Cl.
*H04L 12/00* (2006.01)
*H04L 12/24* (2006.01)
*H04L 29/12* (2006.01)
*H04L 29/08* (2006.01)

(52) U.S. Cl.
CPC ........ *H04L 41/082* (2013.01); *H04L 41/0893* (2013.01); *H04L 41/28* (2013.01); *H04L 61/6086* (2013.01); *H04L 67/1097* (2013.01)

(58) Field of Classification Search
CPC . H04L 12/2409; H04L 12/2424; H04L 12/66; H04L 41/0813
USPC ................. 709/223, 250, 224, 225
See application file for complete search history.

(56) References Cited

U.S. PATENT DOCUMENTS

| | | | | |
|---|---|---|---|---|
| 5,519,878 A * | 5/1996 | Dolin, Jr. | ............ | H04L 12/2803 709/220 |
| 5,909,430 A * | 6/1999 | Reaves | ............. | H04L 29/12018 370/254 |
| 6,052,750 A * | 4/2000 | Lea | ...................... | H04L 12/2803 710/72 |
| 6,314,088 B1 * | 11/2001 | Yamano | ............ | H04L 29/12009 370/254 |
| 6,704,752 B1 * | 3/2004 | Kathail | ............... | H04L 41/0813 |
| 7,124,409 B2 * | 10/2006 | Davis | ........................ | G06F 8/60 717/178 |
| 7,194,544 B2 * | 3/2007 | Natarajan | ............... | H04L 29/06 709/201 |
| 7,385,981 B2 * | 6/2008 | Choi | ................. | H04L 29/12358 370/392 |

(Continued)

FOREIGN PATENT DOCUMENTS

CN 100425024 C 10/2008

OTHER PUBLICATIONS

"DELL EMC VxRAIL™ Network Guide Physical and Logical Network Considerations and Planning." DELL EMC, hite Paper, Oct. 2018, www.dellemc.com/resources/en-us/asset/technical-guides-support-information/products/converged-infrastructure/h15300-vxrail-network-guide.pdf.

*Primary Examiner* — Frantz Coby
(74) *Attorney, Agent, or Firm* — Patent Law Works LLP (57) ABSTRACT

Technology for installing operating configurations in nodes of configurable network computer systems, such as the storage system nodes of a hyper-converged infrastructure system is disclosed. The node is configured with network addresses for two different network protocols. An installer identifies a change in the first network address, then uses the second network address and protocol to change the first network address to a default value. Using the default value, the installer can then install an operating configuration using the first network address and protocol.

20 Claims, 5 Drawing Sheets

(56) References Cited

U.S. PATENT DOCUMENTS

| | | | | |
|---|---|---|---|---|
| 7,539,195 B2* | 5/2009 | Paatela | H04L 29/06 | |
| | | | 370/392 | |
| 7,596,615 B2* | 9/2009 | Satkunanathan | H04L 41/0806 | |
| | | | 700/79 | |
| 7,653,065 B2* | 1/2010 | Koehler, Jr. | H04L 29/12358 | |
| | | | 370/393 | |
| 7,779,089 B2* | 8/2010 | Hessmer | H04L 41/08 | |
| | | | 709/220 | |
| 7,974,311 B2 | 7/2011 | Vesterinen et al. | | |
| 7,990,998 B2* | 8/2011 | Prakash | H04L 12/2898 | |
| | | | 370/450 | |
| 8,005,217 B2* | 8/2011 | Pham | H04W 12/003 | |
| | | | 380/247 | |
| 8,009,641 B2 | 8/2011 | Grech et al. | | |
| 8,145,735 B2* | 3/2012 | Manchester | H04L 29/06 | |
| | | | 709/220 | |
| 8,380,950 B2* | 2/2013 | Kulkarni | G06F 11/1464 | |
| | | | 711/162 | |
| 8,782,278 B2* | 7/2014 | Tsirtsis | H04L 29/12066 | |
| | | | 709/223 | |
| 8,793,348 B2* | 7/2014 | Ott | G06F 8/61 | |
| | | | 709/220 | |
| 9,037,633 B2 | 5/2015 | Tukol et al. | | |
| 9,197,500 B2* | 11/2015 | Mason | G06F 8/61 | |
| 9,253,140 B2 | 2/2016 | Kapadia et al. | | |
| 9,363,158 B2* | 6/2016 | Lingafelt | H04L 45/02 | |
| 9,614,725 B2* | 4/2017 | Bevemyr | H04L 41/02 | |
| 10,129,202 B2* | 11/2018 | Hui | H04L 61/2015 | |
| 10,243,802 B2* | 3/2019 | Erdmann | H04W 4/80 | |
| 2002/0116477 A1* | 8/2002 | Somashekar | G06F 8/61 | |
| | | | 709/220 | |
| 2002/0186701 A1* | 12/2002 | Kaplan | H04L 12/5692 | |
| | | | 370/401 | |
| 2014/0189155 A1* | 7/2014 | Morris | H04L 45/02 | |
| | | | 709/238 | |
| 2014/0280953 A1* | 9/2014 | Brzozowski | H04L 69/167 | |
| | | | 709/226 | |
| 2014/0329467 A1 | 11/2014 | Ewing et al. | | |
| 2015/0229521 A1* | 8/2015 | Mayer | G06F 9/5072 | |
| | | | 709/222 | |
| 2017/0033981 A1* | 2/2017 | Ruble | H04L 41/0846 | |

* cited by examiner

RECONFIGURING NETWORK SETTINGS FOR OPERATING CONFIGURATION INSTALLATION

TECHNICAL FIELD

The present disclosure generally relates to configurable network computer systems. In a more particular non-limiting example, the present disclosure relates to reconfiguring network setting for operating configuration installation in a storage system node.

BACKGROUND

Hyper-converged infrastructure systems are systems for integrating processing, storage, and networking components of a multi-component computing system. Unlike converged systems, in which building blocks of the sub-systems remain discrete (e.g., the storage sub-system and the server sub-system are separate), hyper-converged infrastructure systems use virtualization to manage workloads through a single interface (e.g., a top of the rack switch). The hyper-converged infrastructure includes multiple node elements (e.g., bare metal computer systems), with their own compute, storage, and networking capabilities. The number of node elements is determined based on the capacity requirements and can be changed dynamically over time. Hyper-converged infrastructure systems may include storage system nodes configured for use as object storage systems.

In some configurations, internet protocol version 4 (IPv4) network protocols are used among storage system nodes. An installer may install the operating configuration for the storage system nodes through the top of the rack switch, including a default set of IPv4 network configurations. However, these default network configurations may be changed after the initial install, such as in field deployment or customer use. If the installer connects is connected to these changed systems, such as for reinstalling the original operating configuration, the installer may be incapable of connecting with the storage system nodes over the IPv4 network.

More reliable, efficient, and automated installers for configurable network computer systems may be needed. A need exists for at least improved installation of operating configuration when the current network configuration has been changed from known values.

SUMMARY

The present disclosure generally relates to installers for configurable network computer systems, such as storage system nodes in hyper-converged infrastructure systems. For instance, the disclosure describes technology capable of reconfiguring network setting for operating configuration installation. One general aspect includes a storage system including at least one storage system node. The storage system node includes at least one network interface configured with a first network protocol address configured for a first network protocol and a second network protocol address configured for a second network protocol. The system also includes an installer configured to: identify a change in the first network protocol address from a first network protocol address default value to a first network protocol address updated value; change, using the second network protocol address, the first network protocol address to the first network protocol address default value, and install, using the first network protocol address, an operating configuration on the at least one storage system node.

Implementations may include one or more of the following features. The storage system may have the installer further configured to establish access, using a security credential provided through the second network protocol address, to first network configuration settings in the at least one storage system node, where the first network configuration settings include the first network protocol address. The storage system may have the installer further configured to query, using the second network protocol address, at least one first network configuration value, where the at least one first network configuration value is used to change the first network protocol address to the first network protocol address default value. The at least one first network configuration value may be selected from: first network protocol subnet, rack serial number, and the first network protocol address updated value. The storage system may have the installer further configured to: enable, during the install, the first network protocol and the second network protocol in the at least one storage system node; and bootstrap, using the first network protocol and the first network protocol address, the operating configuration on the at least one storage system node. The first network protocol may comply with internet protocol version 4 (IPv4) and the second network protocol may comply with internet protocol version 6 (IPv6). The storage system may further include a plurality of storage system nodes, where each storage system node of the plurality of storage system nodes includes at least one network interface and each at least one network interface is configured with the first network protocol and the second network protocol. The installer may be further configured to: change, using the second network protocol, a first network protocol configuration for each at least one network interface; and install, using the first network protocol, the operating configuration on each storage system node of the plurality of storage system nodes. The plurality of storage system nodes may include at least one storage node and at least one system node. The plurality of storage system nodes may be connected to the installer through a top of a rack switch configured to support the first network protocol and the second network protocol.

One general aspect includes a computer-implemented method, including: identifying a change in a first network protocol address of a network interface of a storage system node, where the change is from a first network protocol address default value to a first network protocol address updated value; changing, using a second network protocol address for the network interface, the first network protocol address to the first network protocol address default value; and installing, using the first network protocol address, an operating configuration on the storage system node.

Implementations may include one or more of the following features. The computer-implemented method may further include connecting an installer to the storage system node, where identifying, changing, and installing are an automated response to connecting the installer to the storage system node. Connecting the installer to the storage system node may include connecting the installer to the storage system node through a top of a rack switch. The computer-implemented method may further include establishing access, using a security credential provided through the second network protocol address, to first network configuration settings in the storage system node, where the first network configuration settings include the first network protocol address. The computer-implemented method may further include querying, using the second network protocol address, at least one first network configuration value, where the at least one first network configuration value is used to change the first network protocol address to the first network protocol address default value. The computer-implemented method may further include: enabling the first network protocol and the second network protocol in the storage system node; and bootstrapping, using the first network protocol and the first network protocol address, the operating configuration on the storage system node. The first network protocol may comply with internet protocol version 4 (IPv4) and the second network protocol may comply with internet protocol version 6 (IPv6).

One general aspect includes a system that includes a plurality of storage system nodes configured for a plurality of networks. Each storage system node of the plurality of storage system nodes includes a plurality of network interfaces configured for a first network protocol address configured for a first network protocol and a second network protocol address configured for a second network protocol. An installer includes: means for identifying a change in the first network protocol address of each network interface of the plurality of network interfaces, where the change is from first network protocol address default values to first network protocol address updated values; means for changing, using the second network protocol for each network interface of the plurality of network interfaces, the first network protocol addresses to the first network protocol address default values; and means for installing, using the first network protocol addresses, an operating configuration on the plurality of storage system nodes.

Implementations may include one or more of the following features. The installer may further include means for establishing access, using a security credential provided through the second network protocol addresses, to first network configuration settings in the plurality of storage system nodes. The first network configuration settings may include the first network protocol addresses.

The various embodiments advantageously apply the teachings of installers for configurable network computer systems to improve the functionality of such computer systems. The various embodiments include operations to overcome or at least reduce the issues in the previous configurable network computer systems discussed above and, accordingly, make installation of operating configurations more reliable and/or efficient than other computing systems. That is, the various embodiments disclosed herein include hardware and/or software with functionality to improve the installation of an operating configuration when a default network configuration has been changed, such as by using a second network protocol to access the changed configuration settings. Accordingly, the embodiments disclosed herein provide various improvements to storage networks and/or storage systems.

It should be understood, however, that the above list of features is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure describes technology, which may include methods, systems, apparatuses, computer program products, and other aspects, for reconfiguring network settings and installing operating configurations in a node of a configurable network computing system using multiple network protocols. In the following description, for purposes of explanation, numerous specific details are set forth to provide a thorough understanding of the various aspects of different example embodiments. It will be evident, however, that any particular example embodiment may in various cases be practiced without all of the specific details and/or with variations, permutations, and combinations of the various features and elements described herein.

Figure 1:
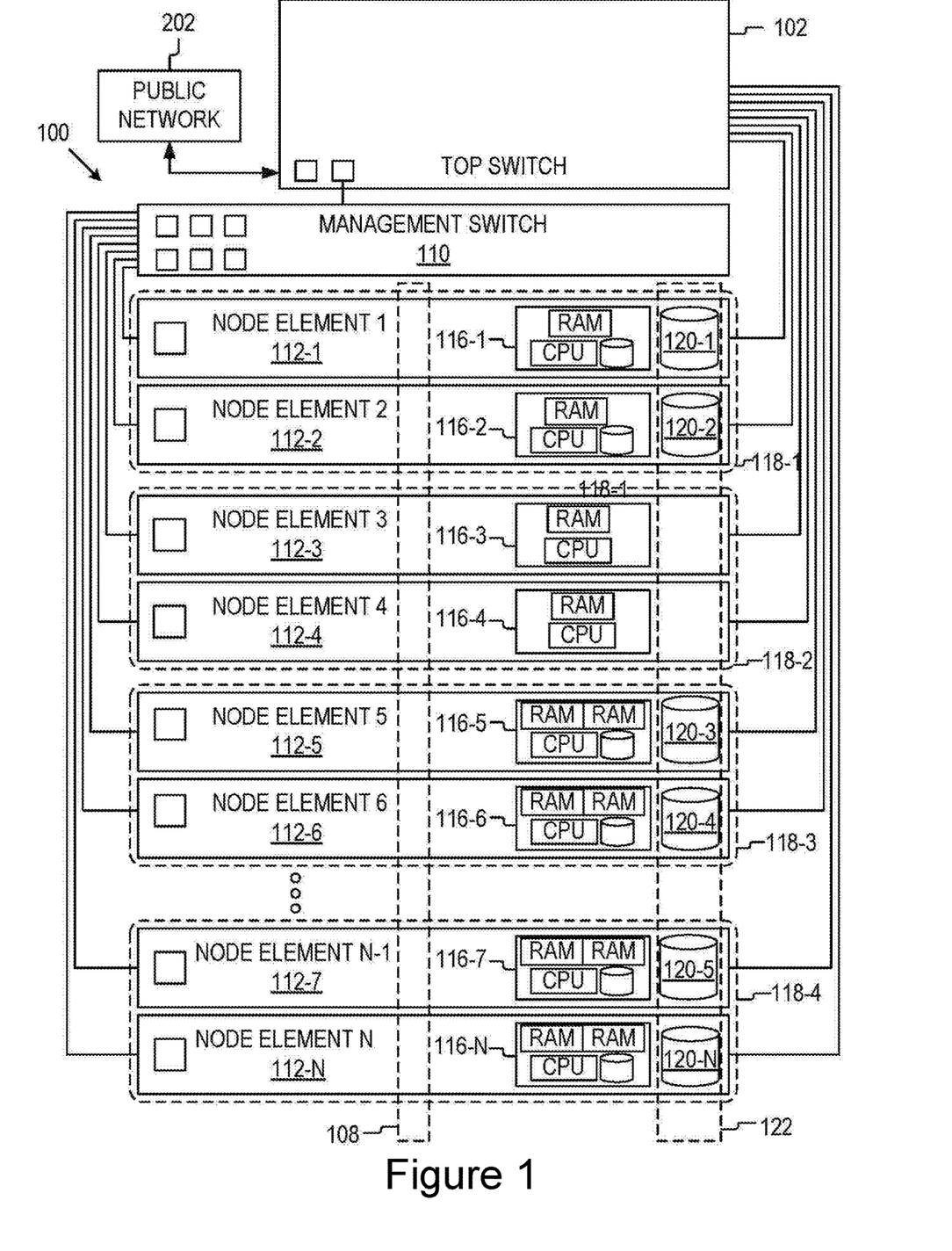
FIG. 1 is a schematic illustration of an example computing system.

FIG. 1 is a schematic illustration of an example computing system, such as a configurable network computing system. The computing system may be a hyper-converged infrastructure system 100 that includes a top switch 102 (or top of the rack switch), a management switch 110, and a plurality of node elements 112-1 to 112-N. It should be recognized that when there are multiple instances of a similar element are depicted they will be labeled with the same reference number followed by a dash ("-") and another number or letter (e.g., 112-3) to designate different instances. In the event a reference numeral appears in the text without a dash and subsequent number or letter, for example, "112," it should be recognized that such is a general reference to different embodiments of the element or component bearing that general reference numeral.

In some embodiments, the top switch 102 may include a pre-installed operating system (OS), such as a Linux operating system. In some embodiments, the operating system may include a kernel-based virtual machine. In some embodiments, the virtual machine may run a pre-boot execution environment, a dynamic host configuration protocol, federated control plane, and/or a software defined storage system. The top switch 102 may be connected to a public network 202 through a network communication port.

In some embodiments, the pre-boot execution environment may include a series of prebuilt operating system images. As new node elements 112 are added to the system 100, the pre-boot execution environment installs or boots the images into the newly added node element 112. The dynamic host configuration protocol may be configured with a range of IP address that can be allocated to node elements 112 as needed. In some embodiments, prebuilt operating system images and/or host/network configurations may be provided by a separate system, such as an installer system that is directly connected to top switch 102 or connects via public network 202.

In some embodiments, the federated control plane may be used to discover new node elements 112 after the new node elements are attached to the top switch 102 and have been given an IP address by a dynamic host configuration protocol (DHCP). The federated control plane may analyze a node element 112 to determine the capabilities of the node element 112. Potential capabilities include working memory (e.g., amount of RAM available to a particular node element 112), the speed of working memory (e.g., how fast are reads and writes executed), the speed and throughput of the one or more processors, the amount of storage available to the node element 112, and so on. The federated control plane may partition the newly added node element 112 into a particular node partition group (118-1 to 118-4) based on the determined capabilities of the newly added node element 112. In some embodiments, one or more node partition groups may include storage system nodes.

The software defined storage system may receive information about the storage resources of the node elements 112-1 to 112-N from the federated control plane 108. Using this information, the software defined storage system may create a global storage pool 122 that can be accessed as a single virtualized storage pool. In some embodiments, storage pool 122 and/or portions thereof may be configured as an object storage system.

A management switch 110 may connect to the top switch 102 and to the intelligent platform management interface (IPMI) of the nodes to collect information about the status of the plurality of node elements 112-1 to 112-N, including but not limited to the temperature, voltages, fans, power supplies, and so on of the node elements 112-1 to 112-N. The management switch 110 may also query information from the nodes (e.g., logged status information or inventory information) and perform some recovery procedures. Any relevant information may then be passed on to the top switch 102.

A node may include one or more processors, memory, and, in some embodiments, storage. The processing, memory, and storage resources of node elements 116-1 to 116-N may define the capabilities of the node element 112. In some example embodiments, a node may include computer system(s) without independent operating systems (e.g., bare metal machines). The node elements may be the same type of bare metal system (e.g., with the same resources) or different types of bare metal systems (e.g., with resources that vary by node element). In addition, a node element 112 may connect to the management switch 110 to report status information through the IPMI and connects to the top switch 102 for high-speed data transmission (e.g., information used to perform the tasks assigned by the federated control plane). In some embodiments, a node may include an operating system and other suitable computing components.

The memory resources of a node may include computer memory. For example, the computer memory included in a particular node may include high-speed random-access memory, such as dynamic random-access memory (DRAM), static random-access memory (SRAM), double data rate random-access memory (DDR RAM), or other random-access solid state memory devices, although other suitable memory devices are also possible and contemplated.

Storage resources may include in a given node may include non-volatile memory, such as one or more magnetic disk storage devices, optical disk storage devices, flash memory devices, or other non-volatile solid state storage devices. The memory and storage resources, or alternatively, the non-volatile memory device(s) within the memory and storage resources, comprise(s) a non-transitory computer-readable storage medium.

The processing resources of a node may be based on the one or more processors included within the node. Processors included in a node can include a variety of different processors including, but not limited to, a computer processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof. A processor may include both single core and multi-core processors that may comprise two or more independent processors (also referred to as "cores") that may execute the instructions contemporaneously. Thus, a node may include a single processor with a single core, a single processor with multiple cores (e.g., a multi-core processor), multiple processors with a single core, multiple processors with multiple cores, or any combination thereof. In addition, nodes can use a plurality of different processor architecture types including but not limited to the x86 processor architecture, the advanced RISC machine (ARM) architecture, the Power PC architecture, and so on.

In the example embodiment shown in FIG. 1, four different node partition groups are displayed, 118-1 to 118-4. A particular node partition group 118 is associated with different capabilities and different resources 116. Node partition group 1 118-1 includes node elements 112-1 and 112-2 which have resources 116-1 and 116-2 and storage units 120-1 and 120-2 respectively. Although difficult to represent visually, node partition group 1 118-1 has additional processing resources and is determined to be for processing intensive tasks.

Node partition group 2 118-2 includes node elements 112-3 and 112-4 which have resources 116-3 and 116-4 respectively. The node elements 112-3 and 112-4 in node partition group 118-2 have no storage resources and are thus part of a stateless node partition group 118-2. This node partition group 118-2 is used for application tasks that do not use storages resources or can store the data at another location.

Node partition group 3 118-3 includes node elements 112-5 and 112-6 which have resources 116-5 and 116-6 and storage units 120-3 and 120-4 respectively. The node elements 112-5 and 112-6 partitioned into node partition group 3 118-3 have excess memory resources. Thus, node partition group 3 118-3 is used for memory intensive tasks.

Node partition group 4 118-4 includes node elements 112-7 and 112-N which have resources 116-7 and 116-N and storage units 120-5 and 120-N respectively. The node elements 112-7 and 112-N partitioned into node partition group 4 118-4 have both more powerful processing resources and excess memory resources. Thus, node partition group 4 118-4 is used for tasks that are both processor and memory intensive.

Figure 2:
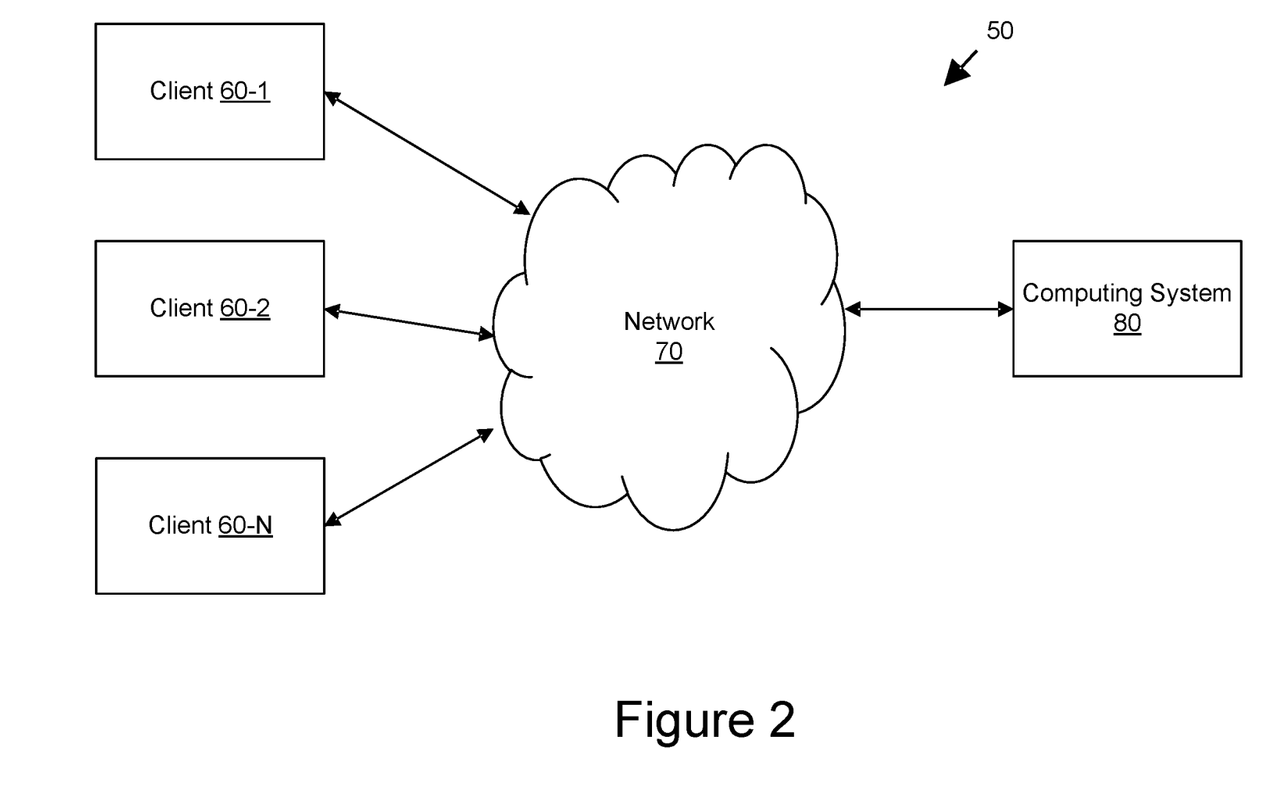
FIG. 2 is a schematic illustration of example computing systems connected over a network.

FIG. 2 is a schematic illustration of an example computing system 80 connected over a network 70 to a plurality of client systems 60-1 to 60-N to form distributed computer system 50. Network 70 may be a conventional type, wired or wireless, and may have numerous different configurations including a star configuration, token ring configuration, or further configurations. Network 70 may include a wide area network (WAN) (e.g., the Internet), a local area network (LAN), a virtual private network (VPN), and/or further interconnected data paths across which multiple devices may communicate. In some instances, network 70 may be a peer-to-peer network. Network 70 may also be coupled to or includes portions of a telecommunications network for sending data in a variety of different communication protocols.

Computing system 80 may be communicatively connected over signal lines to network 70. Client systems 60 may be communicatively connected over signal lines to network 70. Users may be interact with the client systems 60. For example, the user may use an object storage system hosted across distributed computing system 50 on computing system 80 by interacting with, for example, client system 60-1. In some embodiments, an installer may be hosted on one or more client systems 60 for configuring nodes in computing system 80.

In some embodiments, client systems 60 are client devices that include non-transitory memor(ies), processor(s), and communication unit(s), and other components that are communicatively coupled via a communications bus. Client systems 60 may couple to the network 70 and can send and receive data to and from other distributed computing system 50 entities. Non-limiting examples of client systems 60 include a laptop computer, a desktop computer, a tablet computer, a mobile telephone, a personal digital assistant (PDA), a mobile email device, a wearable device, an embedded computing device, or any other electronic device capable of processing information and accessing network 70.

Figure 3:
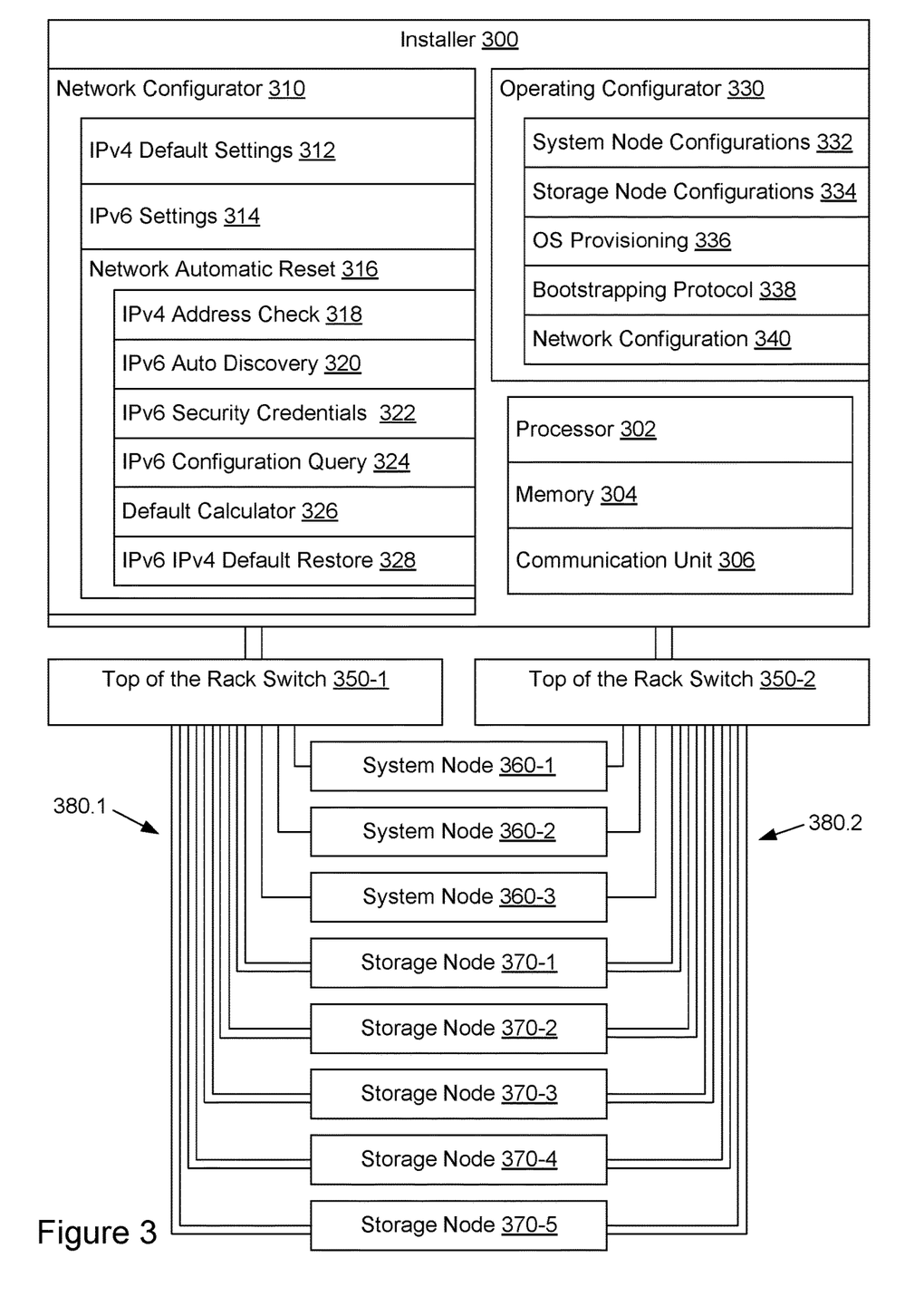
FIG. 3 is a block diagram of an example installer and computing system.

FIG. 3 is a block diagram of an example installer 300 and configurable network computing system. Note that while the term 'top switch' is used to refer to item 350, particularly in describing FIG. 3, in other parts of the application top switch 350 may alternatively be referred to as 'fabric element', or simply 'computing device'. While the functionality of these various terms may be split amongst more than one computer device, for simplicity the functionality is often combined in to a single switch or pair of switches and thus is illustrated as such in this description.

Installer 300 may include or be hosted on a computing system that includes a processor 302, a memory 304, and a communication unit 306. Installer 300 may also include network configurator 310 and operating configurator 330 instantiated in memory 304 for execution by processor 302 or as separate subsystems, such as one or more hardware subsystems with their own processors, memory, and interface. In some implementations, the components of installer 300 are communicatively coupled by a bus.

Processor 302 may include an arithmetic logic unit, a microprocessor, a general-purpose controller, or some other processor array to perform computations and provide electronic display signals to a display device. Processor 302 may be coupled to a bus for communication with the other components. Processor 302 may process data signals and may include various computing architectures including a complex instruction set computer (CISC) architecture, a reduced instruction set computer (RISC) architecture, or an architecture implementing a combination of instruction sets. Although FIG. 3 includes a single processor 302, multiple processors 302 may be included. Further processors, operating systems, sensors, displays and physical configurations are possible.

Memory 304 may include one or more non-transitory computer readable media. Memory 304 may store instructions and/or data that may be executed by processor 302. Memory 304 may be coupled to a bus for communication with the other components. The instructions and/or data may include code for performing the techniques described herein. Memory 304 may be a dynamic random access memory (DRAM) device, a static random access memory (SRAM) device, flash memory, or some other memory device. In some instances, the memory 304 also includes a non-volatile memory or similar permanent storage device and media including a hard disk drive, a floppy disk drive, a compact disk read only memory (CD ROM) device, a digital versatile disk read only memory (DVD ROM) device, a digital versatile disk random access memory (DVD RAM) device, a digital versatile disk read/write (DVD RW) device, a flash memory device, or some other mass storage device for storing information on a more permanent basis.

Communication unit 306 may transmit and receive data to and from a network and/or networked components, such as top switches 350. Communication unit 306 may be coupled to a bus for communication with other components. In some instances, communication unit 306 may include a port for direct physical connection to the network, other components, or to another communication channel. For example, communication unit 306 may include a universal serial bus (USB), secure digital (SD), category 6 (CAT-6) or similar port for wired communication with the network. In some instances, the communication unit 306 includes a wireless transceiver for exchanging data with the network or other communication channels using one or more wireless communication methods, including Institute of Electrical and Electronics Engineers (IEEE) 802.11, IEEE 802.16, BLUETOOTH® or another suitable wireless communication method. Although FIG. 3 includes a communication unit 306, multiple communication units 306 may be included.

In some instances, communication unit 306 includes a cellular communications transceiver for sending and receiving data over a cellular communications network including via short messaging service (SMS), multimedia messaging service (MMS), hypertext transfer protocol (HTTP), direct data connection, wireless application protocol (WAP), e-mail or another suitable type of electronic communication. In some instances, communication unit 306 includes a wired port and a wireless transceiver. Communication unit 306 may also provide other conventional connections to the network for distribution of files and/or media objects using standard network protocols including transmission control protocol/internet protocol (TCP/IP), HTTP, HTTP secure (HTTPS), secure sockets layer (SSL), and simple mail transfer protocol (SMTP), etc.

In some configurations, installer 300 may communicate with top switches 350 (or top of the rack switches 350). For example, communication unit 306 may include one or more ports that may be wired to corresponding ports in top switches 350. In some embodiments, installer 300 may be directly connected to top switches 350 and/or may connect to top switches 350 over a switched network, such as a local area network or public network. Top switches 350 may connect to a plurality of nodes, such as rack node systems in a hyper-converged infrastructure system or distributed storage system. For example, top switches 350 may each connect to system nodes 360 and storage nodes 370 and enable redundant networks paths 380 for communication between or among system nodes 360 and storage nodes 370. In some configurations, client systems (not shown) may be coupled to system nodes 360 via a client network (not shown).

An example rack system configuration, redundant network paths 380 may include a first system network connecting system nodes 360 and storage nodes 370 to top switch 350-1 and a second system network connecting system nodes 360 and storage nodes 370 to top switch 350-2. These system networks may enable system communications among system nodes 360 and storage nodes 370. Redundant network paths 380 may also include a first storage network connecting storage nodes 370 to top switch 350-1 and a second storage network connecting storage nodes 370 to top switch 350-1. These storage networks may enable storage communications, such as movement of client data, among storage nodes 370. Installer 300 may be configured to communicate on both system networks and storage networks. In the example rack system configuration, network paths 380, including both the system networks and storage networks, may be configured with a common networking protocol and corresponding network addresses, such as IPv4. Network paths 380 may also support a second networking protocol, such as IPv6.

In the implementation shown in FIG. 3, installer 300 may include network configurator 310 and operating configurator 330 for installing and/or reinstalling an operating configuration for some or all of storage system nodes 360 and 370. For example, dung a first installation, installer 300 may configure one or more network paths to support IPv4 networks, such as at least one storage network among storage nodes 370 and at least one system network among system nodes 360 and storage nodes 370. These IPv4 networks may be configured with IPv4 default settings 312, including default IPv4 addresses for each of the storage system nodes 360 and 370 with a known subnet mask stored in installer 300. For example, installer 300 may include a default address convention for assigning static IP address default values and set related network configuration parameters in each of storage system nodes 360 and 370. In some embodiments, other network protocols and corresponding network protocol addresses may be used for a primary communication network protocol with storage system nodes 360 and 370.

Installer 300 may also have IPv6 enabled for use over network paths 380 and enable IPv6 on each of storage system nodes 360 and 370. For example, by enabling IPv6 on storage system nodes 360 and 370, link local IPv6 network addresses may be assigned to each system based on their respective media access control (MAC) addresses. In some embodiments, all enabled IPv6 network addresses may be auto discoverable in their respective networks (through top switches 350 and network paths 380). In some embodiments, other network protocols and corresponding network protocol addresses may be used for a secondary communication network protocol that is different than the primary network protocol. By configuring IPv6 settings 314 to enable IPv6 on each of storage system nodes 360 and 370, each node may have a network interface with network configuration settings for a static IPv4 network address and an IPv6 link local address when installation of the network configuration is complete.

In some embodiments, the rack system may be separated from the installer and put into production use with one or more client systems. In production use, one or more of the IPv4 networks may be reconfigured to suit the particular client infrastructure and/or application. Reconfiguring the IPv4 networks may include changing the IPv4 network addresses using client-specific IPv4 subnets or other network address changes. When the rack system is reconnected to installer 300, the change in IPv4 network addresses may render installer 300 initially incapable of communicating over the IPv4 networks to storage system nodes 360 and 370 due to the updated values for the IPv4 network addresses.

Network configurator 310 may include network automatic reset 316 to address possible changes in IPv4 network addresses from network protocol default setting 312. For example, connecting installer 300 to a rack system may automatically trigger network automatic reset 316 to check and selectively reconfigure the network configuration of storage system nodes 360 and 370 of the rack system to be compatible with the IPv4 network addresses known to network configurator 310, such as IPv4 default settings 312.

In some embodiments, installer 300 may already be communicatively connected to storage system nodes 360 and 370, such as over a physical network that includes network paths 380, and network configurator 310 may be initiated as part of an operating configuration process and/or in response to installer 300 receiving an error or being unable to connect to storage system nodes 360 and 370. Network automatic reset 316 may be an automated response of installer 300 based on one or more trigger conditions, such as connection to a target rack system or commencement of an installation workflow that results in an initial failure to connect with one or more rack nodes.

In some embodiments, network automatic reset 316 may initially test network connections with each of storage system nodes 360 and 370 using IPv4 address check 318. For example, IPv4 address check 318 may include logic for pinging each of storage system nodes 360 and 370 at the network addresses in IPv4 default settings 312. A request message may be addressed to the network addresses that causes a response message if the network address is successfully resolved and processed by the network interface of one of storage system nodes 360 and 370. If storage system nodes 360 and 370 do not respond to the request message, network automatic reset 316 may initiate further actions to attempt to discover and reset the IPv4 network settings of the nodes that did not respond.

Network automatic reset 316 may initiate a second network protocol, such as IPv6, to communicate with storage system nodes 360 and 370. For example, IPv6 auto discovery 320 may be initiated to identify the IPv6 network addresses of the nodes via their respective network interfaces. IPv6 network protocols may allow IPv6 auto discovery 320 to use an auto discovery routine or message set for receiving the IPv6 network addresses of storage system nodes 360 and 370. Each storage system node 360 and 370 may respond back with their IPv6 network address.

Installer 300 may include or receive IPv6 login credentials 322 for accessing system settings for storage system nodes 360 and 370. For example, default administrative login credentials may be provided for each node and/or assigned login credentials may be configured and stored in installer 300 or another resource. In some embodiments, other security protocols may be incorporated into accessing the system settings for storage system nodes 360 and 370 and IPv6 login credentials 322 may include any necessary elements for navigating those security protocols. Installer 300 may login to a node with IPv6 login credentials 322 and the IPv6 link local network address from IPv6 auto discover 320.

Installer 300 may use an IPv6 configuration query 324 to discover the IPv4 network settings. For example, installer 300 may query the network configuration settings of each of storage system nodes 360 and 370 and receive a response with the changed network settings, such as custom IPv4 subnets, IPv4 network addresses for both storage and system networks, rack serial number, etc. IPv6 configuration query 324 may include one or more queries or other protocols for retrieving any configuration settings or related parameters or information stored in the system areas of storage system nodes 360 and 370 and accessible with IPv6 login credentials 322.

In some embodiments, installer 300 may use default calculator 326 to determine the IPv4 default settings 312 and/or what network setting values need to be changed to restore default network communication over the IPv4 networks. For example, default calculator 326 may determine default settings based on rack serial number, default subnet mask, and/or other values retrieved from each of storage system nodes 360 and 370 and/or otherwise stored in or accessible to installer 300. In some embodiments, default calculator 326 may calculate or otherwise determine network setting values to be used in one or more messages or commands for reconfiguring network settings in storage system nodes 360 and 370.

Network automatic reset 316 may include an IPv6 IPv4 default restore module 328. For example, IPv6 IPv4 default restore module 328 may use one or more messages or commands sent via IPv6 to change the IPv4 network settings to default values used by installer 300. In some embodiments, changes or updates to each of storage system nodes 360 and 370 may be sent in a plurality of network configuration change commands. For example, a first command may be sent to a target storage system node to update that nodes IPv4 network configuration, such as a network address, back to IPv4 default settings 312, which may include individualized setting calculated by default calculator 326. A second command may be sent to update other IPv4 configuration settings, such as resetting internet protocol management interface (IPMI) configurations or other settings that may assist installer 300 in installing an operating configuration via the IPv4 networks. In some embodiments, the IPv4 configuration settings may enable the installer to bootstrap storage system nodes 360 and 370 for reinstalling operating configurations.

Network automatic reset 316 may use IPv4 address check 318 to ping storage system nodes 360 and 370 that have been reset. For example, IPv4 address check 318 may ping each node with IPv4 default settings 312, such as default IPv4 network addresses on both the system IPv4 network and the storage IPv4 network. On a successful reset, all storage system nodes 360 and 370 may respond to installer 300 and installation may continue with operating configurator 330.

Operating configurator 330 may include protocols, parameters, and/or full or partial operating system images for setting operating system configurations for storage system nodes 360 and 370. For example, operating configurator 330 may be configured to install a default or custom node configuration in each of the nodes based on the hardware configurations of the nodes, storage system and/or application configurations, and/or client-defined parameters or configurations.

Operating configurator 330 may include system node configurations 332 for system nodes 360 and storage nodes configurations 334 for storage nodes 370. As described above, system node configurations 332 may be configured for more processor-oriented hardware and applications and storage node configurations 334 may be configured for more storage-oriented hardware and applications. In some embodiments, system node configurations 332 may be configured as storage controllers and storage node configurations 334 may be configured as storage pools, such as arrays of sold state drives and/or hard disk drives.

Operating system provisioning 336 may enable operating configurator 330 to store or access operating system images and load them into storage system nodes 360 and 370. For example, operating system provisioning may include identifying the target nodes and corresponding configurations, initiating an installation session, and awaiting bootstrapping of the target nodes. Bootstrapping protocol 338 may allow the target nodes to bootstrap into their operating configuration over IPv4 communication with installer 300 and/or related install resources. For example, bootstrapping protocol 338 may enable an OS installer to be provided over the IPv4 network to boot the target node and download the appropriate operating system image and other operating configurations (e.g. system node configurations 332 or storage nodes configurations 334). In some embodiments, operating configurator 330 may include a network configuration 340, such as the network configuration of network configurator 310 with IPv4 default settings 312 and IPv6 settings 316, that is installed and/or configured through operating system provisioning 336.

Figure 4:
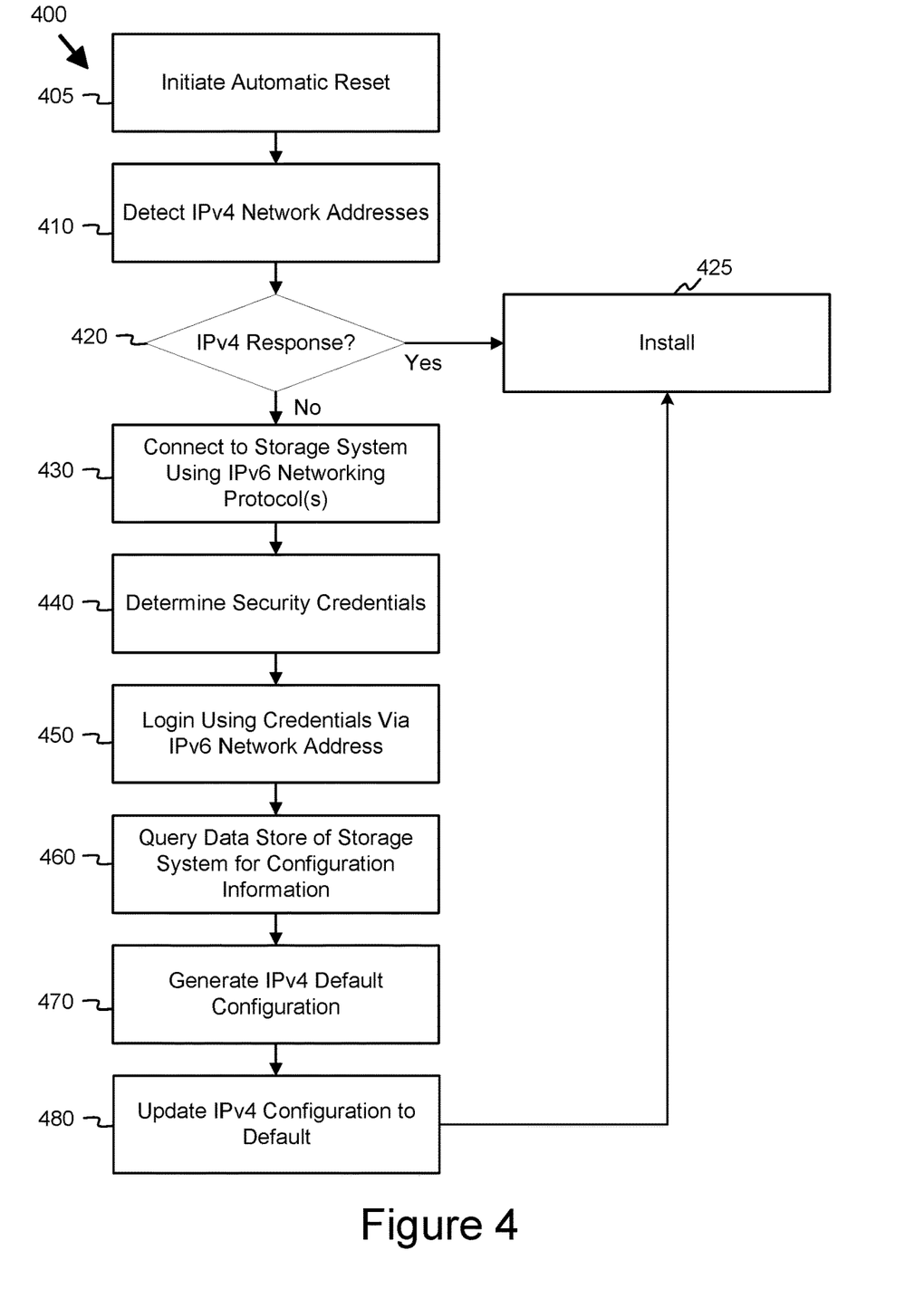
FIG. 4 is a flowchart of an example method for automatic reset of a network configuration for installation.

FIG. 4 is a flowchart of a method 400 for automatic reset of an IPv4 network configuration for installation of operating configurations in target rack nodes of a storage system, in accordance with some example embodiments. Method 400 may, for example, be executed by an installer system, such as installer 300 in FIG. 3.

At block 405, an automatic network reset may be initiated by the installer system in response to one or more trigger conditions. For example, an automatic reset may be triggered by connecting an installer system to a rack system that has previously been configured and/or used in client operations. Other example triggers may include failing to detect one or more nodes using IPv4 network communications during troubleshooting or repair of a system, initiating of a new install or operating configuration change, or an error condition in a previously attempted install.

At block 410, the installer system may attempt to detect at least one IPv4 network address for a target node and IPv4 network. For example, the installer system may ping a default IPv4 network address for the target node on an IPv4 network. At block 420, if there is an IPv4 response from the target node at the default IPv4 address, the installer system may proceed to block 425 for installation. If there is no IPv4 response, method 400 may continue to block 430.

At block 430, the installer system may connect to the storage system node using IPv6 networking protocols. For example, the installer system may use IPv6 auto detect to determine the IPv6 network address for the target node. The installer system may then use the IPv6 network address for additional communication with the target node.

At block 440, the installer system may determine security credentials for logging into the target node. For example, installer system may include or have access to default administrative login credentials for the target node. In some embodiments, one or more user credentials may have been setup for system administration purposes during the initial or subsequent configuration of the target node and be received by the installer system.

At block 450, the installer system may log into the target node via the IPv6 network address using the security credentials. For example, the installer system may provide the security credentials with a login command or respond to a security challenge for the system. Once the security credentials are accepted, the installer system may have administrative access to one or more system areas of the target node, such as system memory areas or other data stores containing network configuration settings.

At block 460, the installer system may query a data store of the storage system node for network configuration information. For example, the installer system may query network configuration settings including network addresses, rack serial number, etc. The installer system may send the query and receive responsive data, such as a configuration file or list of configuration parameters, over the IPv6 network.

At block 470, the installer system may generate IPv4 default configuration parameters for the target node. For example, the installer system may retrieve or determine default network address and related parameters based on identification of the target node and rack.

At block 480, the installer system may update the IPv4 configuration in the target node to the default IPv4 network configuration over the IPv6 network. For example, the installer system may issue one or more configuration commands to change the network configuration parameters to the default IPv4 network values, such as a default IPv4 network address, expected by other components of the installer system. Default network configuration values may include any network configuration values used by the other components of the installer system to install the operating configuration over the IPv4 network and network address at block 425.

Figure 5:
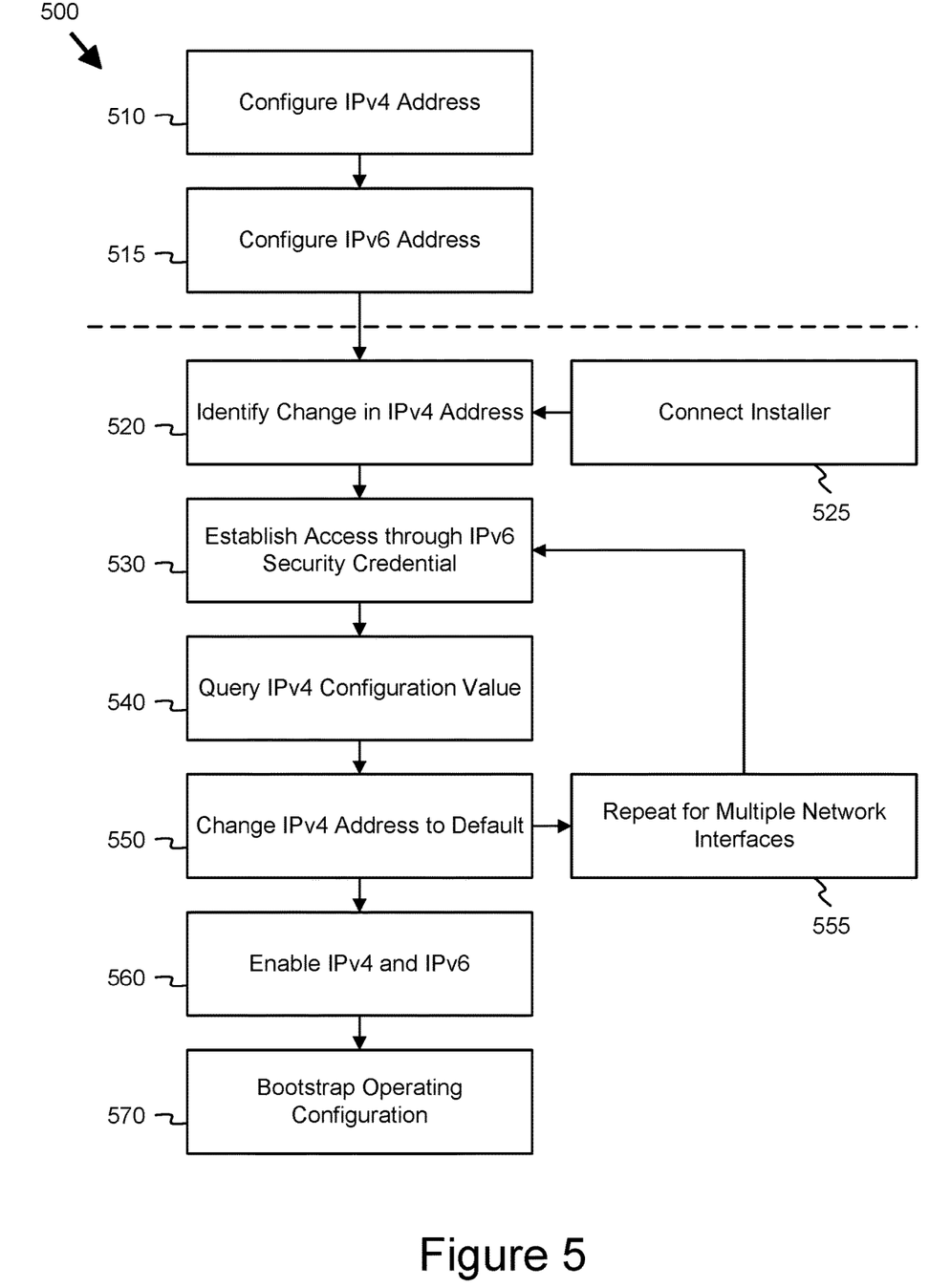
FIG. 5 is a flowchart of an example method for installing an operating configuration.

FIG. 5 is a flowchart of an example method 500 for installing or reinstalling an operating configuration in a network computing system, such as a storage system. Method 500 may, for example, be executed by an installer system, such as installer 300 in FIG. 3 and/or use the automatic network reset method 400 in Figure.

At block 510, the target storage system may be configured with one or more IPv4 network addresses for use over IPv4 network protocols. At block 515, the target storage system may also be configured with one or more IPv6 network addresses for accessing the same system resources, such as a storage system node. Initial configuration and enablement of the IPv4 network addresses and IPv6 network addresses for the storage system may be part of an initial or prior operating configuration installation completed by another installer system.

At block 520, a change is identified in the IPv4 network address. For example, a returned storage system may not respond to IPv4 network communication using the prior IPv4 network addresses. In some cases, an installer system may be connected to the storage system at block 525 and the installer system may detect the change in IPv4 network addresses.

At block 530, secure access to the storage system may be established over IPv6, using a security credential associated with the storage system. For example, the IPv6 network addresses may not be changed and/or may be auto detected to enable network communications and access to administrative system resources in the storage system through appropriate login credentials.

At block 540, one or more IPv4 network configuration values may be queried from the storage system using the IPv6 network. For example, configuration values describing the changed IPv4 network configuration and/or identifying the storage system default IPv4 network configuration may be returned.

At block 550, the IPv4 network address and other network configuration settings in the storage system may be changed to the default network configuration values using the IPv6 network. In configurations where the storage system supports redundant network interfaces and network paths, method 500 may return to blocks 530-550 to repeat for multiple network interfaces at block 555.

At block 560, the installer system may verify that the storage system is enabled for both IPv4 and IPv6 with the default network address settings. For example, the installer system may ping each storage system node and interface with both protocols to verify they are enabled.

At block 570, an operating configuration for the storage system may be bootstrapped over the IPv4 network. For example, the storage system and/or storage nodes therein may boot and load an operating configuration, such as an operating system image, from or through the installer system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and/or all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context

What is claimed is:

1. A storage system, comprising:
    at least one storage system node including at least one network interface, wherein the at least one network interface is configured with:
        a first network protocol address configured for a first network protocol; and
        a second network protocol address configured for a second network protocol; and
    an installer communicatively connected to the at least one network interface and configured to:
        identify a change in the first network protocol address from a first network protocol address default value to a first network protocol address updated value;
        connect to the at least one storage system node using the second network protocol address and the second network protocol to establish network communication;
        change, using the second network protocol address and the second network protocol, a first network protocol address to the first network protocol address default value;
        connect to the at least one storage system node using the first network protocol address and the first network protocol to establish network communication; and
        install, using the first network protocol address and the first network protocol, an operating configuration on the at least one storage system node.

2. The storage system of claim 1, wherein the installer is further configured to:
    establish access, using a security credential provided through the second network protocol address, to first network configuration settings in the at least one storage system node, wherein the first network configuration settings include the first network protocol address.

3. The storage system of claim 1, wherein the installer is further configured to:
    query, using the second network protocol address, at least one first network configuration value, wherein the at least one first network configuration value is used to change the first network protocol address to the first network protocol address default value.

4. The storage system of claim 3, wherein the at least one first network configuration value is selected from:
    first network protocol subnet;
    rack serial number; and
    the first network protocol address updated value.

5. The storage system of claim 1, wherein the installer is further configured to:
    enable, during the install, the first network protocol and the second network protocol in the at least one storage system node; and
    bootstrap, using the first network protocol and the first network protocol address, the operating configuration on the at least one storage system node.

6. The storage system of claim 1, wherein the first network protocol complies with internet protocol version 4 (IPv4).

7. The storage system of claim 1, wherein the second network protocol complies with internet protocol version 6 (IPv6).

8. The storage system of claim 1, further comprising:
    a plurality of storage system nodes, wherein:
        each storage system node of the plurality of storage system nodes includes at least one network interface, wherein each at least one network interface is configured with the first network protocol and the second network protocol; and
        the installer is further configured to:
            change, using the second network protocol, a first network protocol configuration for each at least one network interface; and
            install, using the first network protocol, the operating configuration on each storage system node of the plurality of storage system nodes.

9. The storage system of claim 8, wherein the plurality of storage system nodes includes at least one storage node and at least one system node.

10. The storage system of claim 8, wherein the plurality of storage system nodes are connected to the installer through a top of a rack switch configured to support the first network protocol and the second network protocol.

11. A computer-implemented method, comprising:
    identifying, by an installer communicatively connected to a storage system node, a change in a first network protocol address of a network interface of the storage system node, wherein the change is from a first network protocol address default value to a first network protocol address updated value;
    connecting the installer to the storage system node using a second network protocol address and a second network protocol to establish network communication;

changing, using the second network protocol address and the second network protocol, a first network protocol address to the first network protocol address default value;

connecting to the storage system node using the first network protocol address and the first network protocol to establish network communication; and installing, using the first network protocol address and the first network protocol, an operating configuration on the storage system node.

12. The computer-implemented method of claim 11, further comprising:

connecting the installer to the storage system node, wherein identifying, connecting using the second network protocol, changing, connecting using the first network protocol, and installing are an automated response to connecting the installer to the storage system node.

13. The computer-implemented method of claim 12, wherein connecting the installer to the storage system node includes connecting the installer to the storage system node through a top of a rack switch.

14. The computer-implemented method of claim 11, further comprising:

establishing access, using a security credential provided through the second network protocol address, to first network configuration settings in the storage system node, wherein the first network configuration settings include the first network protocol address.

15. The computer-implemented method of claim 11, further comprising:

querying, using the second network protocol address, at least one first network configuration value, wherein the at least one first network configuration value is used to change the first network protocol address to the first network protocol address default value.

16. The computer-implemented method of claim 11, further comprising:

enabling the first network protocol and the second network protocol in the storage system node; and bootstrapping, using the first network protocol and the first network protocol address, the operating configuration on the storage system node.

17. The computer-implemented method of claim 11, wherein the first network protocol complies with internet protocol version 4 (IPv4).

18. The computer-implemented method of claim 11, wherein the second network protocol complies with internet protocol version 6 (IPv6).

19. A system, comprising:

a plurality of storage system nodes configured for a plurality of networks, wherein:

each storage system node of the plurality of storage system nodes includes a plurality of network interfaces; and each network interface of the plurality of network interfaces is configured for:

a first network protocol address configured for a first network protocol; and a second network protocol address configured for a second network protocol; and an installer, communicatively connected to the plurality of networks, including:

means for identifying a change in the first network protocol address of a target network interface of the plurality of network interfaces, wherein the change is from a first network protocol address default value to a first network protocol address updated value;

means for connecting to the target network interface using the second network protocol address and the second network protocol to establish network communication;

means for changing, using the second network protocol and the second network protocol address for the target network interface, a first network protocol address to the first network protocol address default value; and means for connecting to the target network interface using the first network protocol address and the first network protocol to establish network communication; and means for installing, using the first network protocol address for the target network interface and the first network protocol, an operating configuration on a target storage system node from the plurality of storage system nodes through the target network interface.

20. The system of claim 19, wherein the installer further comprises:

means for establishing access, using a security credential provided through the second network protocol address, to first network configuration settings in the target storage system node, wherein the first network configuration settings include the first network protocol address.

* * * * *